United States Patent [19]

Iacovangelo

[11] 4,448,857
[45] May 15, 1984

[54] CATHODE COMPOSITE FOR MOLTEN CARBONATE FUEL CELL

[75] Inventor: Charles D. Iacovangelo, Schenectady, N.Y.

[73] Assignee: General Electric Company, Schenectady, N.Y.

[21] Appl. No.: 416,448

[22] Filed: Sep. 10, 1982

[51] Int. Cl.³ .............................. H01M 4/86
[52] U.S. Cl. ........................... 429/41; 429/45; 429/220; 429/223; 252/182.1
[58] Field of Search ............... 429/41, 44, 45, 218, 429/220, 223; 75/234, 233; 252/182.1

[56] References Cited

U.S. PATENT DOCUMENTS

| | | | |
|---|---|---|---|
| 4,308,299 | 12/1981 | Arendt | 429/16 X |
| 4,322,482 | 3/1982 | Bushnell | 429/41 |
| 4,361,631 | 11/1982 | Iacovangelo | 429/44 X |
| 4,389,467 | 6/1983 | Singh et al. | 429/41 |

*Primary Examiner*—Charles F. LeFevour

*Attorney, Agent, or Firm*—Jane M. Binkowski; James C. Davis, Jr.; James Magee, Jr.

[57] ABSTRACT

A cathode composite useful for a molten carbonate fuel cell comprised of a porous sintered cathode having a porous sintered bubble pressure barrier integrally sintered to one face thereof, said cathode composite having a porosity ranging from about 25% by volume to about 75% by volume of the total volume of said composite, said cathode having a porosity ranging from about 25% by volume to about 75% by volume of the total volume of said cathode, said pressure barrier having a porosity ranging from about 25% by volume to about 75% by volume of the total volume of said barrier, said cathode having a median pore size ranging from in excess of one micron to about 10 microns, said barrier having a median pore size significantly smaller than that of said cathode, said cathode and said pressure barrier being comprised of from about 10 weight % to about 90 weight % $Li_xNi_{(1-x)}O$/balance $Li_yCu_{(1-y)}O$, where x and y each ranges from about 0.005 to about 0.25.

5 Claims, 4 Drawing Figures

CATHODE COMPOSITE FOR MOLTEN CARBONATE FUEL CELL

The present invention relates to the production of a cathode composite useful for a molten carbonate fuel cell comprised of a porous sintered metal oxide cathode having a porous sintered metal oxide bubble pressure barrier integrally sintered to one face thereof.

The state of the art in molten carbonate fuel cell (MCFC) cathodes is to use porous sintered Ni electrodes. These structures are typically 60–70% porous, having average pore sizes of 6–8 microns. In an operating cell, these cathodes are placed in contact with an $Li_2CO_3/K_2CO_3/LiAlO_2$ or $SrTiO_3$ composite, i.e. a composite composed of electrolyte and supporting matrix referred to in the art as tile. The $LiAlO_2$ or $SrTiO_3$ particles form a matrix the interstices of which are filled with the carbonate melt. The average pore size in this matrix is 0.2–0.4 micron. The gas feed to the cathode is a mixture of $O_2$ and $CO_2$ and some of the pores in the cathode during operation at 650° C. draw electrolyte ($Li_2CO_3/K_2CO_3$) from the tile providing a reaction zone for the oxygen reduction reaction to form carbonate via the overall reaction:

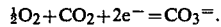

The overall reaction at the anode, which is on the opposite side of the tile, is as follows:

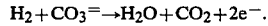

One of the pivotal problems encountered with operating cells occurs when the tile does not act as a sufficient bubble pressure barrier to the anode and cathode gases or it cracks. When this happens, the gases mix causing, as a minimum, a drop in the cell voltage and loss of electrochemically utilizing fuel, or in more severe cases, oxidation of the nickel anode, and a potential safety hazard. The present invention overcomes these problems by providing a cathode which contains, as an integral part of its structure, a barrier to this gas cross leak problem.

In the present invention, a layer of a porous sintered structure is incorporated as an integral part of the cathode. By controlling the size of the particles used to produce the cathode composite, a wide range of pore sizes can be achieved. In the present composite, the barrier has a median pore size significantly smaller than that of the cathode component. Since in the presence of an insufficient amount of electrolyte to completely fill all of the pores in the electrodes and electrolyte matrix, the electrolyte fills the smallest pores, one can control the location of the electrolyte and degree of protection by controlling the size of the pores in the bubble pressure barrier of the cathode. By making the pores in this barrier layer small enough to ensure complete filling, the anode and cathode gases can mix only if a sufficient pressure drop exists across the cell to blow the electrolyte out of the pores. For example, if the median pore size, i.e. median pore diameter, of the pores in the barrier layer is approximately $1\mu$–$3\mu$, it would theoretically take a $\Delta P$ of ~39 psia without flaws.

Since the pores in the barrier layer are smaller than the remaining electrode, they fill with electrolyte functioning as a barrier to cross leak without "flooding" the remaining active electrode area, i.e. the cathode. In addition to serving as a cross leak barrier, this barrier layer also ensures integral contact of the cathode to the tile and may allow operation with thinner tiles thus decreasing the cell resistance and increasing the power of the cell. Another feature of this invention is that since the present cathode is already made by sintering, the addition of this barrier layer should add very little to the processing cost and is amenable to low cost processing operations such as tape casting. Another advantage of this invention is that if portions of the barrier layer do not fill with electrolyte, or lose electrolyte with time, they are still comprised of material which functions as the catalyst required to carry out the $O_2$ reduction reaction and are, therefore, electrochemically active pores just like the cathode.

Briefly stated, the present cathode composite is comprised of a porous sintered cathode, i.e. cathode component, having a porous sintered bubble pressure barrier integrally sintered to one face thereof covering said face and being coextensive therewith, said cathode composite having a pore volume ranging from about 25% by volume to about 75% by volume of the total volume of said composite, said cathode having a pore volume ranging from about 25% by volume to about 75% by volume of the total volume of said cathode, said pressure barrier having a pore volume ranging from about 25% by volume to about 75% by volume of the total volume of said barrier, said cathode having a median pore size ranging from in excess of one micron to about 10 microns, said barrier having a median pore size significantly smaller than that of said cathode, said cathode and said pressure barrier being comprised of from about 10 weight % to about 90 weight % $Li_xNi_{(1-x)}O$/balance $Li_yCu_{(1-y)}O$, where x and y each ranges from about 0.005 to about 0.25.

Those skilled in the art will gain a further and better understanding of the present invention from the detailed description set forth below, considered in conjunction with the figures accompanying and forming a part of the specification, in which.

Figure 1:
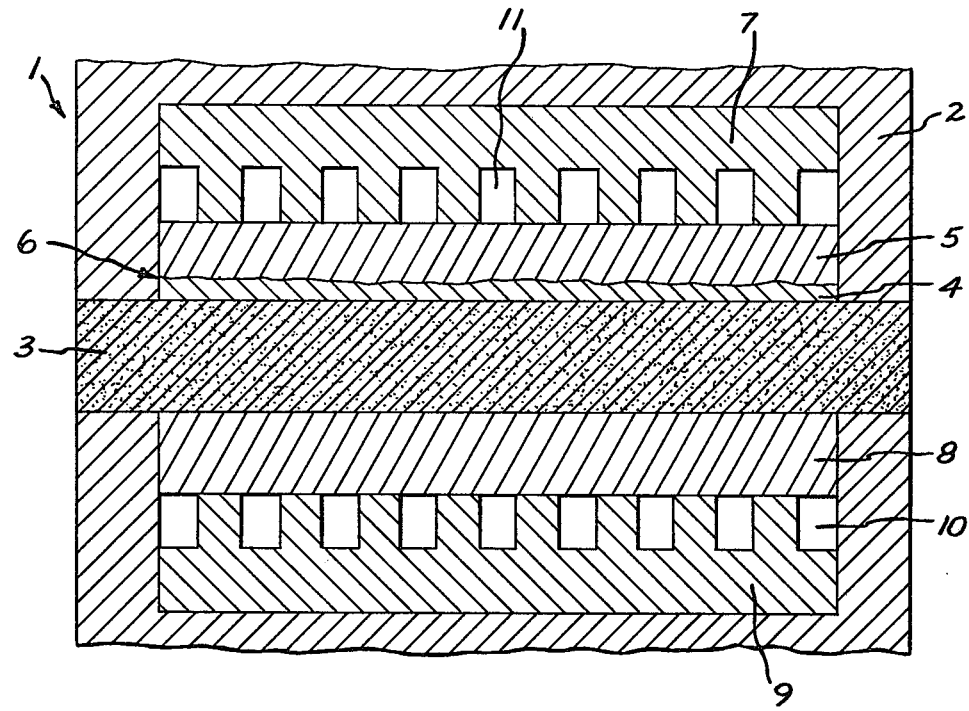
FIG. 1 shows in cross-section the cell hardware of one type of molten carbonate fuel cell with the present cathode composite.

Specifically, FIG. 1 shows cell 1 with solid metal housing 2. One face of tile 3 is in contact with bubble pressure barrier 4 integrally sintered to cathode component, i.e. cathode 5. Barrier 4 and cathode 5 comprise the present cathode composite 6. Current collector plate 7 is associated with cathode 5. Plate 7 is corrugated providing openings 11 for reactant gases for the oxygen reduction reaction. Anode 8 contacts the opposite face of tile 3. Current collector plate 9 is associated with anode 8. Plate 9 is corrugated providing openings 10 for reactant gases for the hydrogen oxidation reaction.

In the present composite, the cathode and the pressure barrier, each is comprised of from about 10 weight % to about 90 weight % $Li_xNi_{(1-x)}O$/balance $Li_yCu_{(1-y)}O$, where x and y each ranges from about 0.005 to about 0.25. The cathode and the barrier may be of the same composition or may differ in composition.

To produce the present composite, a mixture of $Li_xNi_{(1-x)}O$ powder and $Li_yCu_{(1-y)}O$ powder, or alternately $Li_{(x+y)}Ni_{(1-x)}Cu_{(1-y)}O$ powder formed substantially simultaneously as a mixture or solid solution, where x and y each ranges from about 0.005 to about 0.25, is used. A value of x or y below about 0.005 results in a cathode of insufficient electronic conductivity to be useful in a molten carbonate fuel cell. On the other hand, the maximum value of x or y of about 0.25 is the maximum value of Li cation which can be incorporated or dissolved into the nickel oxide or copper oxide. Preferably, x and y each has a value of about 0.05 because that is close to the equilibrium value for operating conditions of the fuel cell.

The present $Li_xNi_{(1-x)}O$ powder, $Li_yCu_{(1-y)}O$ powder and $Li_{(x+y)}Ni_{(1-x)}Cu_{(1-y)}O$ powder can be produced by a number of techniques. Preferably, the $Li_xNi_{(1-x)}O$ powder is produced according to the method set forth in U.S. Pat. No. 4,308,299 for "Lithiated Nickel Oxide" to Arendt, assigned to the assignee hereof, and incorporated herein by reference.

U.S. Pat. No. 4,308,299 discloses a process for producing lithiated nickel oxide powder of approximately predetermined $Li^+$ cation content which comprises providing particulate NiO in a predetermined amount of precursor thereof, providing a source of $Li^+$ cation in a predetermined amount, providing an alkali chloride salt selected from the group consisting of sodium chloride, potassium chloride and mixtures thereof, forming a mixture of said NiO or precursor therefor, said source of $Li^+$ cation and said chloride salt solvent, heating said mixture to a reaction temperature at least sufficient to melt said chloride salt, dissolving in said molten solvent the source of $Li^+$ cation and a portion of the NiO particles, said precursor decomposing completely at or below said reaction temperature to produce said NiO particles and by-product gas, said source of $Li^+$ cation being dissolvable in said molten chloride solvent to produce $Li^+$ cation and by-product gas, reacting the dissolved NiO and $Li^+$ cation in said molten solvent precipitating the resulting lithiated nickel oxide onto the undissolved NiO particles forming an adherent black encapsulating coating thereon, said molten chloride solvent being maintained at a reaction temperature lower than the temperature at which said lithiated nickel oxide melts, said alkali chloride solvent being present in an amount at least sufficient to carry out said reaction, and recovering the coated NiO particles by dissolving said chloride salt and separating said coated NiO particles from the resulting said solution. Preferably, the source of $Li^+$ cation is selected from the group consisting of $Li_2O$, $LiNO_3$, $LiOH$, $Li_2CO_3$ and $Li_2SO_4$.

Preferably, the present $Li_yCu_{(1-y)}O$ powder is prepared according to the disclosure of U.S. Pat. No. 4,308,299 except that copper oxide would be used instead of nickel oxide.

Likewise, preferably, the $Li_{(x+y)}Ni_{(1-x)}Cu_{(1-y)}O$ powder which may be a solid solution or a mixture of $Li_{(x)}Ni_{(1-x)}O/Li_yCu_{(1-y)}O$ powder is prepared according to the disclosure of U.S. Pat. No. 4,308,299 except that copper oxide would be substituted for a portion of the nickel oxide.

The particulate mixture for producing the present cathode composite is comprised of from about 10 wt % to about 90 wt % $Li_xNi_{(1-x)}O$/balance $Li_yCu_{(1-y)}O$. For best results, the mixture is comprised of from about 45 wt % to about 55 wt %, and most preferably 50 wt %, $Li_xNi_{(1-x)}O$/balance $Li_yCu_{(1-y)}O$. A mixture containing less than about 10 weight % $Li_xNi_{(1-x)}O$ is likely to produce an insufficiently sintered structure too weak and fragile to be useful as a cathode. On the other hand, a mixture containing more than about 90 weight % of $Li_xNi_{(1-x)}O$ is likely to require a firing temperature higher than about 1000° C. causing significant loss of lithium and producing a structure too brittle and too weakly bonded to be useful.

Particle size, or particle size distribution, of the oxide powder or powders can vary and depends on the final pore volume, i.e. porosity, and mean pore size desired in the sintered structure, i.e. the present cathode composite. Specifically, the final porosity and mean pore size of the cathode, and the bubble pressure barrier are variable by choosing $Li_xNi_{(1-x)}O$, $Li_yCu_{(1-y)}O$, or $Li_{(x+y)}Ni_{(1-x)}Cu_{(1-y)}O$ powder of different sizes.

Generally, to produce the cathode, i.e. cathode component, of the present cathode composite, the average size or size distribution of the powder or powders ranges from about 1.5 microns to about 10 microns, and preferably, it ranges from about 2 microns to about 7 microns. Generally, to produce the bubble pressure barrier, the average size or size distribution of the powder or powders ranges from about 0.1 micron to about 3 microns and preferably, it ranges from about 0.5 micron to about 2 microns.

The $Li_xNi_{(1-x)}O$ and $Li_yCu_{(1-y)}O$ powders are admixed to produce at least a substantially homogeneous mixture, i.e. dispersion, of the two powders. The mixing operation and any medium used to promote mixing of the present powders should have no significant deleterious effect thereon. The cathode-forming powder or mixture of powders as well as the barrier-forming powder or mixture of powders can be formed into a compact of desired shape and size by a number of conventional techniques.

One approach is to suspend the powder or mixture of powders in an appropriate liquid medium such as water, filter the suspension and deposit it on a supporting substrate in the desired size and thickness. A second technique for making the powders is to roll mill the two powders for an adequate time to insure good blending. The mixture is then doctor bladed into the desired size and thickness. Preferably, the cathode-forming particulate material is deposited on an appropriate supporting substrate, for example, an alumina plate, in the form of a substantially uniform layer and the barrier-forming particulate material is deposited in the form of a layer on the deposited cathode-forming layer coextensive therewith to produce a composite. Preferably, the unsintered composite is pressed at room temperature to increase its density as desired. Also, preferably the unsintered composite is sintered between suitable plates, such as for example alumina ceramic plates. The top plate provides a minor but sufficient pressure, usually less than 1 psi, which prevents formation of voids, i.e. excessively large pores, during sintering. The specific thickness and density of the unsintered compact or unsintered compact composite depends largely on the desired structure of the sintered cathode composite.

In the present invention the cathode composite can be produced by a number of techniques. For example, the cathode-forming material or the sintered cathode can be integrally sintered to the barrier-forming material or to the sintered barrier. Preferably, the entire cathode composite is formed simultaneously by sintering a composite of a body of cathode-forming material and a body of barrier-forming material.

The present sintering or firing is carried out in air at or about atmospheric pressure at a temperature ranging from about 600° C. to about 1000° C. At temperatures below about 600° C. there is insufficient bonding between the particles or grains to produce a sintered structure with sufficient mechanical strength to be useful as a cathode in a molten carbonate fuel cell. At temperatures higher than about 1000° C., loss of lithium occurs producing a structure with insufficient conductivity to be useful as a cathode in a molten carbonate fuel cell. For best results, sintering is carried out at a temperature ranging from about 800° C. to about 900° C., and at such temperature range, sintering usually is completed in from about 30 minutes to about 2 hours.

The present firing or sintering has no significant effect on the composition of the present invention sintered cathode composite. Specifically, the present sintered cathode composite does not differ significantly in composition from that of the composite which was fired to produce it.

The present cathode composite is useful as a cathode in a molten carbonate fuel cell and usually it is in the form of a plaque, i.e. a plate of uniform or substantially uniform thickness with a pair or flat faces. Specifically, it is comprised of a porous sintered cathode which is usually in the form of a plate or plaque, and a porous sintered bubble pressure barrier, which also is usually in the form of a plate or plaque. In order for the present cathode composite to function satisfactorily, the bubble pressure barrier is integrally sintered to one face of the cathode and covers that cathode face entirely, i.e. it is coextensive therewith.

The present cathode composite has a pore volume ranging from about 25% by volume to about 75% by volume, and preferably about 40% by volume, of the total volume of the composite. In the present cathode composite, the cathode or active electrode, has a total pore volume, i.e. porosity, ranging from about 25% by volume to about 75% by volume, and preferably about 40% by volume, of the total volume of the cathode. Also, in the present cathode composite, the pressure barrier has a total pore volume ranging from about 25% by volume to about 75% by volume, and preferably about 40% by volume, of the total volume of the pressure barrier. The pore volume of about 40% is preferred since such porosity provides the cathode composite with good surface area for electrochemical reactions and allows it to have good density necessary for strength. Ordinarily, the cathode, i.e. cathode component, and the bubble pressure barrier of the present cathode composite have about the same pore volume.

The specific pore volume and pore size or pore size distribution of the present cathode composite is determinable empirically. Pores are distributed throughout the cathode composite. Specifically, the pore volume and pore size or pore size distribution of the cathode component depends largely on the porosity of the matrix supporting the carbonate electrolyte as well as the operating conditions of the cell. For best results, the cathode, i.e. cathode component, should have a pore volume and pore size distribution which allow enough electrolyte to enter it to accomplish reaction but not so much as to "flood" it to the point where the reacting gas cannot diffuse rapidly to its reaction sites. Small pores in the cathode or matrix for the electrolyte retain electrolyte in preference to large pores. In order for the cathode to perform well, it must take up enough electrolyte to allow the cell reaction; yet it must not take up so much electrolyte that the gas cannot diffuse rapidly to and from the reaction sites. Preferably, therefore, the cathode should have some percentage of pores which are smaller than pores in the matrix for the electrolyte to retain electrolyte and a larger percentage of pores which are greater than pores in the matrix for the electrolyte so as to remain dry. Generally, the median pore size of the cathode ranges from in excess of one micron to about 10 microns, and preferably its median pore size ranges from about 3 microns to about 6 microns. Also, generally, the pores in the cathode range in size from about 0.1 micron to about 20 microns, and frequently they range from about 2 microns to about 10 microns. Preferably, the cathode ranges in thickness from about 0.01 inch to about 0.1 inch.

The size of the pores in the sintered bubble pressure barrier are critical. The barrier component of the composite must have a median or mean pore size significantly smaller than the median pore size of the cathode component. Specifically, the pores of the barrier must be sufficiently small so that they are filled, i.e. flooded, with electrolyte in order that electrolyte be maintained in the barrier. Generally, the median pore size or pore diameter in the barrier ranges from about $0.2\mu$ to about $2\mu$, and typically, it ranges from about $0.5\mu$ to about $1.5\mu$. The pores in the barrier can be as small as desired. The specific pore volume and pore size or pore size distribution in the pressure barrier is determinable empirically.

The present bubble pressure barrier can be as thin as desired. Generally, as a practical matter, the barrier has a minimum thickness of about $25\mu$. Also, it can be as thick as desired, for example, as thick as about $750\mu$. Typically, the thickness of the barrier ranges from about $125\mu$ to about $250\mu$.

The present cathode composite is electrochemically active for the reactions of the molten carbonate fuel cell, and it is useful as a cathode in a molten carbonate fuel cell.

The invention is further illustrated by the following examples:

EXAMPLE 1

Each powder in the powder composition of Table 1 was produced and retrieved according to the disclosure set forth in U.S. Pat. No. 4,308,299. Specifically, a molten salt medium comprised of 50 mole % KCl and 50 mole % NaCl was used. There was no significant loss of reactants in the reaction to produce the lithiated nickel or copper oxide. LiOH was reacted with nickel oxide (NiO), each in the appropriate amount, to produce the lithiated nickel oxide given in Table I. Also, LiOH was reacted with copper oxide (CuO), each in the appropriate amount, to produce the lithiated copper oxide given in Table I. Also, LiOH was reacted with a mixture of CuO and NiO, each in the appropriate amount, to produce the lithiated copper nickel oxide powder given in Table I. Reaction temperatures ranged from 700° C. to 1100° C. and reaction time to produce each given powder was two hours.

In Table I, the equivalent particle diameter size of Runs 1-8 was determined from BET surface measurement of the powder.

TABLE I

| Run No. | Powder | Preparation of Powder Temp. (°C.) | Time (hrs) | Equivalent Particle Diameter ($\mu$) |
|---|---|---|---|---|
| 1 | $Li_{.08}Cu_{.45}Ni_{.47}O$ | 700 | 2 | 0.72 |
| 2 | $Li_{.02}Cu_{.98}O$ | 800 | 2 | 5.2 |
| 3 | $Li_{.02}Ni_{.98}O$ | 1100 | 2 | 3.1 |
| 4 | $Li_{.02}Ni_{.98}O$ | 1100 | 2 | 4.7 |
| 5 | $Li_{.05}Cu_{.47}Ni_{.48}O$ | 700 | 2 | 0.72 |
| 6 | $Li_{.05}Cu_{.95}O$ | 800 | 2 | 5.2 |
| 7 | $Li_{.041}Ni_{.959}O$ | 1100 | 2 | 4.0 |
| 8 | $Li_{.05}Ni_{.95}O$ | 700 | 2 | 0.8 |
| 9 | $Li_{.01}Cu_{.99}O$ | 800 | 2 | ~5 |

EXAMPLE 2

The powders used in this example were prepared in Example 1.

50 weight % of $Li_{0.02}Cu_{0.98}O$ powder with equivalent particle diameter of 5.2 microns and 50 weight % of $Li_{0.02}Ni_{0.98}$ powder with equivalent particle diameter of 3.1 microns were admixed and the resulting mixture was used as the cathode-forming material.

$Li_{0.08}Cu_{0.45}Ni_{0.47}O$ powder with equivalent particle diameter of 0.72 micron was used as the bubble pressure barrier-forming material.

An unsintered composite was prepared comprised of a layer of the cathode-forming material and a contacting layer of the barrier-forming material coextensive therewith. 60 weight % of the unsintered composite was comprised of the cathode-forming powder and 40 weight % of the composite was comprised of the barrier-forming powder.

To produce the unsintered composite, the barrier-forming powder was suspended in water to produce an aqueous suspension. Also, the cathode-forming powder was suspended and mixed in water forming a suspension of the particulate mixture.

The barrier-forming suspension was vacuum cast, i.e. filtered, as a substantially uniform layer on a flat piece of filter paper. The cathode-forming suspension was vacuum cast as a layer on top of the deposited barrier-forming layer and was coextensive therewith.

The cast cathode-forming layer was covered with a filter paper, the resulting structure was placed between a pair of paper towels, and the resulting sandwich structure was pressed at room temperature under a pressure of about 1000 psi for about 2 minutes.

One filter paper was peeled away from the resulting composite which was then transferred to a supporting alumina plate and the second filter paper peeled away therefrom. An alumina ceramic plate was placed on top of the composite covering it, and the resulting structure was fired in air at atmospheric pressure at 900° C. for two hours and then furnace-cooled to room temperature.

Example 2 is illustrated in Table II. Examples 3 to 7 in Table II were carried out in substantially the same manner as Example 2 except as noted herein and in Table II. Specifically, in each example of Table II, the powder was produced in Example 1.

In Examples 3 to 7, an unsintered composite was produced in substantially the same manner as in Example 2. The unsintered composite was comprised of a layer of cathode-forming particulate mixture and a layer of bubble pressure barrier-forming powder which was in contact with and coextensive with the cathode-forming layer.

The procedure in Examples 8 and 9 was substantially the same as in Example 2 except that no barrier-forming layer was prepared.

In each example of Table II, firing was carried out in air at atmospheric pressure at the given firing temperature for the given time at firing temperature. In each example of Table II, the product was furnace-cooled to room temperature.

In Table II, the given median pore size and porosity was obtaind by analysis of the sintered product by mercury intrusion porosimetry.

TABLE II

| Examples | Unsintered Body Powder Composition | | | Equivalent Particle Diameter ($\mu$) | Firing Temp. (°C.) | Firing Time (hrs) | Sintered Product Size (inches) | Median Pore Size ($\mu$) Barrier | Median Pore Size ($\mu$) Cathode | Pore Volume % by Vol. of Product |
|---|---|---|---|---|---|---|---|---|---|---|
| 2 | Barrier Forming | 40 wt % $Li_{.08}Cu_{.45}Ni_{.47}O$ | | 0.72 | 900 | 2 | 5 × 5 × 0.030 | — | — | — |
| | Cathode Forming | 60 wt % | 50 wt % $Li_{.02}Cu_{.98}O$ | 5.2 | | | | | | |
| | | | 50 wt % $Li_{.02}Ni_{.98}O$ | 3.1 | | | | | | |
| 3 | Barrier Forming | 40 wt % $Li_{.05}Cu_{.47}Ni_{.48}O$ | | 0.72 | 900 | 2 | 5 × 5 × 0.033 | 1.5 | 3 | 45 |
| | Cathode Forming | 60 wt % | 50 wt % $Li_{.05}Cu_{.95}O$ | 5.2 | | | | | | |
| | | | 50 wt % $Li_{.02}Ni_{.98}O$ | 3.1 | | | | | | |
| 4 | Barrier Forming | 40 wt % $Li_{.05}Cu_{.47}Ni_{.48}O$ | | 0.72 | 900 | 2 | 5 × 5 × 0.028 | 1.2 | 3.3 | 45 |
| | Cathode Forming | 60 wt % | 50 wt % $Li_{.05}Cu_{.95}O$ | 5.2 | | | | | | |
| | | | 50 wt % $Li_{.02}Ni_{.98}O$ | 4.7 | | | | | | |
| 5 | Barrier Forming | 40 wt % $Li_{.05}Cu_{.47}Ni_{.48}O$ | | 0.72 | 900 | 2 | 5 × 5 × 0.027 | 0.7 | 2.8 | 38 |
| | Cathode Forming | 60 wt % | 50 wt % $Li_{.05}Cu_{.95}O$ | 5.2 | | | | | | |
| | | | 50 wt % $Li_{.02}Ni_{.98}O$ | 4.7 | | | | | | |
| 6 | Barrier Forming | 44.4 wt % $Li_{.05}Cu_{.47}Ni_{.48}O$ | | 0.72 | 900 | 2 | 5 × 5 × 0.024 | 1.7 | 2.5 | 37 |

TABLE II-continued

| Examples | Unsintered Body Powder Composition | | | Equivalent Particle Diameter ($\mu$) | Firing Temp. (°C.) | Firing Time (hrs) | Sintered Product Size (inches) | Median Pore Size ($\mu$) Barrier | Median Pore Size ($\mu$) Cathode | Pore Volume % by Vol. of Product |
|---|---|---|---|---|---|---|---|---|---|---|
| 7 | Forming Cathode | 55.6 wt % | 50 wt % $Li_{.05}Cu_{.95}O$ | 5.2 | 900 | 2 | 5 × 5 × 0.029 | 0.5 | 2.5 | 29 |
|  | Forming Barrier |  | 50 wt % $Li_{.041}Ni_{.959}O$ | 4.0 |  |  |  |  |  |  |
|  |  | 44.4 wt % $Li_{.05}Cu_{.47}Ni_{.48}O$ | | 0.72 |  |  |  |  |  |  |
|  | Forming Cathode | 55.6 wt % | 50 wt % $Li_{.05}Cu_{.95}O$ | 5.2 |  |  |  |  |  |  |
|  | Forming |  | 50 wt % $Li_{.041}Ni_{.959}O$ | 4.0 |  |  |  |  |  |  |
| 8 | 100 wt % $Li_{.05}Ni_{.95}O$ | | | 0.8 | 1400 | 1 | — | — | — | — |
| 9 | 100 wt % $Li_{.01}Cu_{.99}O$ | | | ~5 | 1100 | 2 | — | — | — | — |

Examples 2–7 of Table I illustrate the present invention. The sintered product of Examples 2–7 was a cathode composite in the form of a plaque, i.e. a plate with a pair of flat faces, and each would be useful as a cathode in a molten carbonate fuel cell. Specifically, the sintered product of Examples 2–7 was comprised of a porous sintered bubble pressure barrier integrally sintered to one face of a porous sintered cathode, and the pressure barrier covered the face of the cathode and was coextensive therewith.

The sintered composite product of Examples 2–7 was black in color indicating no significant loss of lithium ion. Specifically, the sintered composite product of Examples 2–7 was a strong, well bonded, self-supporting structure which would be useful as a cathode in a molten carbonate fuel cell. The sintered product of Example 8 was green in color indicating loss of lithium ion, extremely friable, not self supporting and would not be useful as a cathode in a molten carbonate fuel cell. The sintered product of Example 9 was black in color, but it was extremely friable, not self supporting and would not be useful as a cathode in a molten carbonate fuel cell. Although it was still black in color, it is believed that the product of Example 9 had undergone significant loss of lithium ion since past experiments carried out in substantially the same manner as Example 9 showed substantial loss of lithium ion.

Figure 4:
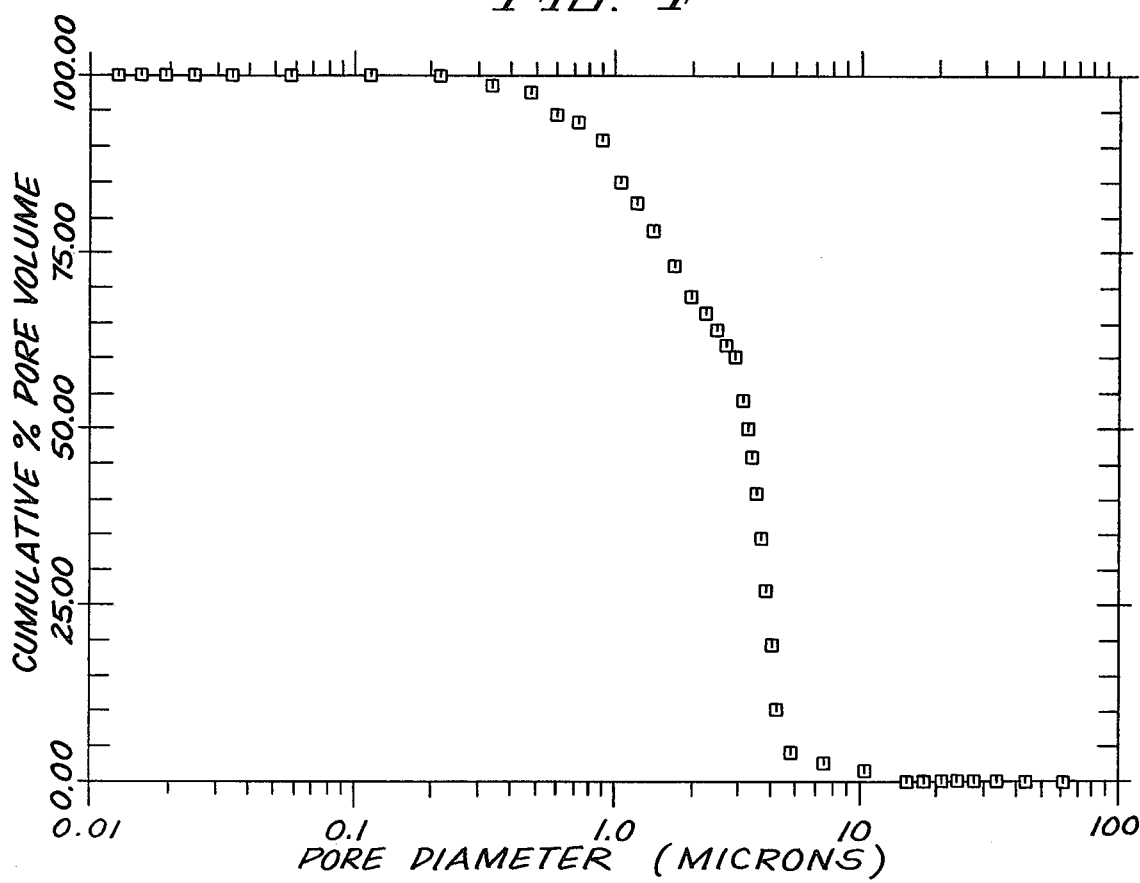
FIG. 4 illustrates on a semi-logarithmic scale the pore size distribution of a cathode composite of the present invention.

Analysis by mercury intrusion porosimetry of the sintered composite product of Example 4 is shown in FIG. 4. Specifically, FIG. 4 shows for the cathode part of the composite a pore size range from about 3 microns to about 7 microns with a median pore size of about 3.3 microns, and for the pressure barrier a pore size range of from about 0.4 micron to about 3 microns with a median pore size of about 1.5 microns. Also, FIG. 4 shows that about 60% by volume of the porosity is in the cathode and about 40% by volume of the porosity is in the pressure barrier.

Figure 2:
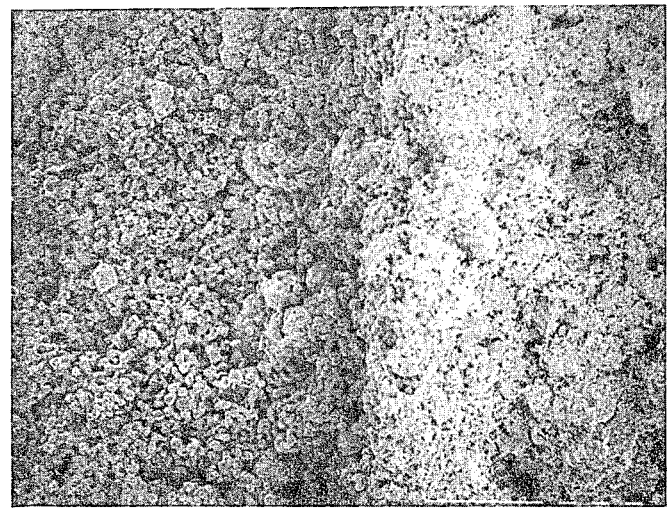
FIG. 2 is a scanning electron micrograph (magnified 200X) of the interface of the present cathode composite showing the cathode integrally sintered to the bubble pressure barrier.
Figure 3:
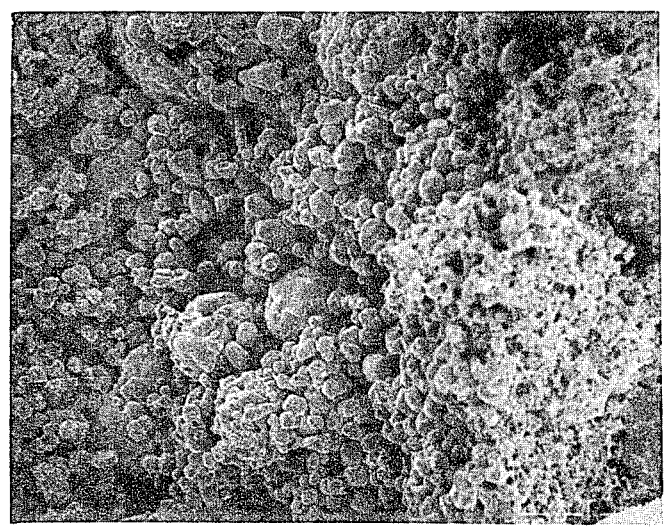
FIG. 3 is a scanning electron micrograph (magnified 500X) of a portion of the interface of FIG. 2.

In order to be able to examine the interface of the composite, i.e. the integrally sintered portion between the cathode and the pressure barrier, the sintered composite of Example 4 was cracked approximately in half and its cracked surface portion is illustrated in FIGS. 2 and 3. FIGS. 2 and 3 show the integrally sintered portion of the present cathode composite, i.e. the portion between the cathode and the pressure barrier. Also, FIGS. 2 and 3 show that the mean pore size of the bubble pressure barrier is significantly smaller than the mean pore size of the cathode to which it is sintered.

In copending application, Ser. No. 416,449 filed on even date herewith for C.D. Iacovangelo, entitled CATHODE FOR MOLTEN CARBONATE FUEL CELL, assigned to the assignee hereof and incorporated herein by reference, there is disclosed a sintered body useful as a cathode in a molten carbonate fuel cell, said sintered body being composed of from about 10 weight % to about 90 weight % of $Li_xNi_{(1-x)}O$/balance $Li_yCu_{(1-y)}O$, where x and y each ranges from about 0.005 to about 0.25, said sintered body having a porosity ranging from about 25% by volume to about 75% by volume of the total volume of said sintered body, said sintered body having a median pore size ranging from in excess of 1 micron to about 10 microns.

What is claimed is:

1. A cathode composite useful for a molten carbonate fuel cell comprised of a porous sintered cathode having a porous sintered bubble pressure barrier integrally sintered to one face thereof covering said face and being coextensive therewith, said cathode composite having a pore volume ranging from about 25% by volume to about 75% by volume of the total volume of said composite, said cathode having a pore volume ranging from about 25% by volume to about 75% by volume of the total volume of said cathode, said pressure barrier having a pore volume ranging from about 25% by volume to about 75% by volume of the total volume of said barrier, said cathode having a median pore size ranging from in excess of one micron to about 10 microns, said barrier having a median pore size significantly smaller than that of said cathode, said cathode and said pressure barrier being comprised of from about 10 weight % to about 90 weight % $Li_xNi_{(1-x)}O$/balance $Li_yCu_{(1-y)}O$, where x and y each ranges from about 0.005 to about 0.25.

2. The cathode composite according to claim 1 wherein said composite has a pore volume of about 40% by volume of the total volume of said composite.

3. The cathode composite according to claim 1 in the form of a plaque.

4. The cathode composite according to claim 1 wherein x and y each has a value of about 0.02.

5. The cathode composite according to claim 1 wherein said cathode and said barrier barrier each has about the same said pore volume.

* * * * *